(12) United States Patent
Yim et al.

(10) Patent No.: US 12,267,599 B2
(45) Date of Patent: Apr. 1, 2025

(54) IMAGE CAPTURING METHOD USING PLURALITY OF CAMERAS, AND ELECTRONIC DEVICE THEREFOR

(71) Applicant: SAMSUNG ELECTRONICS CO., LTD., Suwon-si (KR)

(72) Inventors: Sunggeun Yim, Suwon-si (KR); Ahron Yang, Suwon-si (KR); Minkeun Cho, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/398,158

(22) Filed: Dec. 28, 2023

(65) Prior Publication Data

US 2024/0129640 A1    Apr. 18, 2024

Related U.S. Application Data

(63) Continuation of application No. 17/987,547, filed on Nov. 15, 2022, now Pat. No. 11,877,072, which is a
(Continued)

(30) Foreign Application Priority Data

May 15, 2020    (KR) .................. 10-2020-0058195

(51) Int. Cl.
*H04N 23/80*    (2023.01)
*H04N 23/45*    (2023.01)
(Continued)

(52) U.S. Cl.
CPC ........... *H04N 23/815* (2023.01); *H04N 23/45* (2023.01); *H04N 23/632* (2023.01); *H04N 23/64* (2023.01); *H04N 23/651* (2023.01); *H04N 23/69* (2023.01)

(58) Field of Classification Search
CPC .... H04N 23/815; H04N 23/45; H04N 23/632; H04N 23/64; H04N 23/651; H04N 23/69; H04N 23/62; H04N 23/631
See application file for complete search history.

(56) References Cited

U.S. PATENT DOCUMENTS

| | | |
|---|---|---|
| 8,189,960 B2 | 5/2012 | Kondo et al. |
| 9,148,588 B2 | 9/2015 | Jung et al. |

(Continued)

FOREIGN PATENT DOCUMENTS

| | | |
|---|---|---|
| JP | 4513906 B2 | 7/2010 |
| JP | 2013-214857 A | 10/2013 |

(Continued)

OTHER PUBLICATIONS

International Search Report mailed Aug. 20, 2021 for PCT/KR2021/005681.

(Continued)

*Primary Examiner* — Mekonnen D Dagnew
(74) *Attorney, Agent, or Firm* — CANTOR COLBURN LLP

(57) ABSTRACT

An electronic device includes: a plurality of image sensors including a first image sensor and a second image sensor; a processor; a display connected to the processor; and memory storing instructions being executable by the processor, which cause the electronic device to at least: execute a camera application; activate all of the plurality of image sensors, based on at least one of a specified event executed through the camera application, determine a first image sensor among the plurality of image sensors as an image sensor outputting image data to be displayed on the display, set a resolution of first image data acquired through the first image sensor as a first resolution, and in response to the determination, set a resolution of second image data acquired through a second image sensor among the plurality (Continued)

of image sensors as a second resolution lower than the first resolution.

17 Claims, 9 Drawing Sheets

Related U.S. Application Data continuation of application No. PCT/KR2021/005681, filed on May 6, 2021.

(51) Int. Cl.
*H04N 23/60* (2023.01)
*H04N 23/63* (2023.01)
*H04N 23/65* (2023.01)
*H04N 23/69* (2023.01)

(56) References Cited

U.S. PATENT DOCUMENTS

| | | | |
|---|---|---|---|
| 9,253,397 | B2 | 2/2016 | Lee et al. |
| 9,420,178 | B2 | 8/2016 | Park et al. |
| 9,635,307 | B1 | 4/2017 | Mysore Vijaya Kumar et al. |
| 9,686,472 | B2 | 6/2017 | Kimura |
| 9,813,615 | B2 | 11/2017 | Lee et al. |
| 10,194,089 | B2 | 1/2019 | Nash et al. |
| 10,306,164 | B2 | 5/2019 | Ajito |
| 10,578,948 | B2 | 3/2020 | Shabtay et al. |
| 10,742,860 | B2 | 8/2020 | Ouyang et al. |
| 10,825,146 | B2 | 11/2020 | Ouyang et al. |
| 10,944,908 | B2 | 3/2021 | An et al. |
| 11,317,073 | B2 | 4/2022 | Maruyama |
| 2009/0128635 | A1 | 5/2009 | Baek et al. |
| 2011/0115917 | A1* | 5/2011 | Lee .............. G06V 10/147 348/E7.085 |
| 2014/0232905 | A1 | 8/2014 | Jung et al. |
| 2014/0267842 | A1 | 9/2014 | Lee et al. |
| 2015/0229889 | A1* | 8/2015 | Boettiger .............. H04N 23/71 348/262 |
| 2016/0360121 | A1 | 12/2016 | Cheng et al. |
| 2018/0013955 | A1 | 1/2018 | Kim et al. |
| 2018/0025478 | A1 | 1/2018 | Lee et al. |
| 2018/0183982 | A1 | 6/2018 | Lee et al. |
| 2018/0324357 | A1* | 11/2018 | Silverstein .............. H04N 23/62 |
| 2020/0103726 | A1 | 4/2020 | Shabtay et al. |

FOREIGN PATENT DOCUMENTS

| | | |
|---|---|---|
| JP | 2016-34076 A | 3/2016 |
| JP | 2016-072931 A | 5/2016 |
| JP | 2016-541206 A | 12/2016 |
| JP | 2017-46186 A | 3/2017 |
| JP | 2020-42665 A | 3/2020 |
| JP | 2020-533883 A | 11/2020 |
| JP | 6935587 B2 | 9/2021 |
| KR | 10-2007-0117776 A | 12/2007 |
| KR | 10-2009-0052161 A | 5/2009 |
| KR | 10-2013-0010590 A | 1/2013 |
| KR | 10-2014-0104731 A | 8/2014 |
| KR | 10-2014-0114501 A | 9/2014 |
| KR | 10-2016-0012743 A | 2/2016 |
| KR | 10-2018-0005543 A | 1/2018 |
| KR | 10-2018-0011539 A | 2/2018 |
| KR | 10-2018-0109918 A | 10/2018 |
| KR | 10-2018-0132982 A | 12/2018 |
| KR | 10-1954192 B1 | 3/2019 |
| KR | 10-2023179 B1 | 9/2019 |
| KR | 10-2020-0117507 A | 10/2020 |
| KR | 10-2021-0108037 A | 9/2021 |

OTHER PUBLICATIONS

Korean Office Action for KR Application No. 10-2020-0058195 mailed on Aug. 12, 2024.

* cited by examiner

IMAGE CAPTURING METHOD USING PLURALITY OF CAMERAS, AND ELECTRONIC DEVICE THEREFOR

CROSS-REFERENCE TO RELATED APPLICATIONS

This application is a continuation application of U.S. patent application Ser. No. 17/987,547, filed on Nov. 15, 2022, which is a continuation application, claiming priority under § 365(c), of an International application No. PCT/KR2021/005681, filed on May 6, 2021, which is based on and claims the benefit of a Korean patent application number 10-2020-0058195, filed on May 15, 2020, in the Korean Intellectual Property Office, the disclosure of which is incorporated by reference herein in its entirety.

TECHNICAL FIELD

Embodiments disclosed in the present document relate to a technique for photographing and storing an image by using a plurality of cameras included in an electronic device.

BACKGROUND ART

A portable terminal such as a smartphone includes a camera for taking pictures and videos. A recently released smartphone can mount cameras on a front surface and a rear surface, respectively. The smartphone can take a picture of an object by using the camera mounted on the rear surface, or perform self-photography, etc. by using the camera mounted on the front surface.

A plurality of cameras is mounted on a smartphone, as the performance improvement of the camera for the smartphone is increasingly desirable. The smartphone can mount various cameras such as a wide camera, an ultrawide camera, a tele camera, and a time of flight (TOF) camera. Also, in accordance with a photographing mode and photographing environment of the camera, the cameras of the smartphone operate simultaneously, or switching between the cameras is achieved.

When several cameras are operating simultaneously in a multiple camera environment, image data acquired through each camera is forwarded to a processor through all pipelines of an image signal processor and is displayed on a display or stored in a memory.

Technical Problem

An electronic device can synthesize image data acquired from a plurality of cameras and display it on a display. However, when not synthesizing and using several image data, the electronic device displays image data acquired from one camera on the display. In this case, when the electronic device deactivates the camera of a stand-by state, the electronic device must again activate and drive the camera of the stand-by state at a time when acquiring a user input for camera switching or simultaneous photographing, so a time delay can occur.

The electronic device must activate all the cameras in order to prevent a delay caused by a camera driving time, and must continuously process all the image data acquired from the activated cameras. However, the respective image data are image-processed through the pipeline of the image signal processor, with a criterion of a resolution that is set once. Accordingly, owing to an unnecessarily high capacity of the image data acquired from the camera of the stand-by state, current consumption can increase and a heat generation phenomenon can occur.

Solution to Problem

Various embodiments of the present disclosure may present an electronic device for reducing current consumption and preventing heat generation, by adjusting a resolution of image data passing through a pipeline of an image signal processor.

An electronic device of an embodiment disclosed in the present document may include: a plurality of image sensors including a first image sensor and a second image sensor, at least one processor electrically connected to the plurality of image sensors, and a display connected to the at least one processor. The at least one processor included in the electronic device may activate the first image sensor and the second image sensor, acquire first image data by means of the first image sensor, acquire second image data by means of the second image sensor, and determine to output a preview image that is based on the first image data among the first image data and the second image data, to the display. In response to the above determination to output the preview image, the at least one processor may set a resolution of the first image data as a first resolution, and set a resolution of the second image data as a second resolution lower than the first resolution.

Also, in an embodiment disclosed in the present document, an electronic device may include a plurality of image sensors, at least one processor electrically connected to the plurality of image sensors, and a display connected to the at least one processor. The at least one processor may activate all of the plurality of image sensors, in response to a specified event, and determine a first image sensor among the plurality of image sensors as an image sensor outputting image data to be displayed on the display, based on photographing information. In response to the above determination, the at least one processor may set a resolution of first image data acquired through the first image sensor as a first resolution, and set a resolution of second image data acquired through the second image sensor among the plurality of image sensors as a second resolution lower than the first resolution.

Also, an operating method of an electronic device of an embodiment disclosed in the present document may include: activating a first image sensor and a second image sensor, acquiring first image data by means of the first image sensor, acquiring second image data by means of the second image sensor, determining to output a preview image that is based on the first image data among the first image data and the second image data, to a display, setting a resolution of the first image data as a first resolution in response to the above determination to output the preview image, and setting a resolution of the second image data as a second resolution lower than the first resolution in response to the determination to output the preview image.

Advantageous Effects of Invention

According to various embodiments disclosed in the present document, a resolution of image data outputted from an image sensor of a stand-by state may be downscaled and thus a bandwidth may be effectively reduced.

Also, according to various embodiments, after camera switching, current consumption may be effectively reduced and a heat problem may be solved.

Besides this, various effects directly or indirectly identified through the present document may be presented.

DETAILED DESCRIPTION

Hereinafter, various embodiments of the present disclosure are disclosed with reference to the accompanying drawings. However, the present disclosure is not intended to be limited by the various embodiments of the present disclosure to a specific embodiment and it is intended that the present disclosure covers all modifications, equivalents, and/or alternatives of the present disclosure provided they come within the scope of the appended claims and their equivalents.

Figure 1:
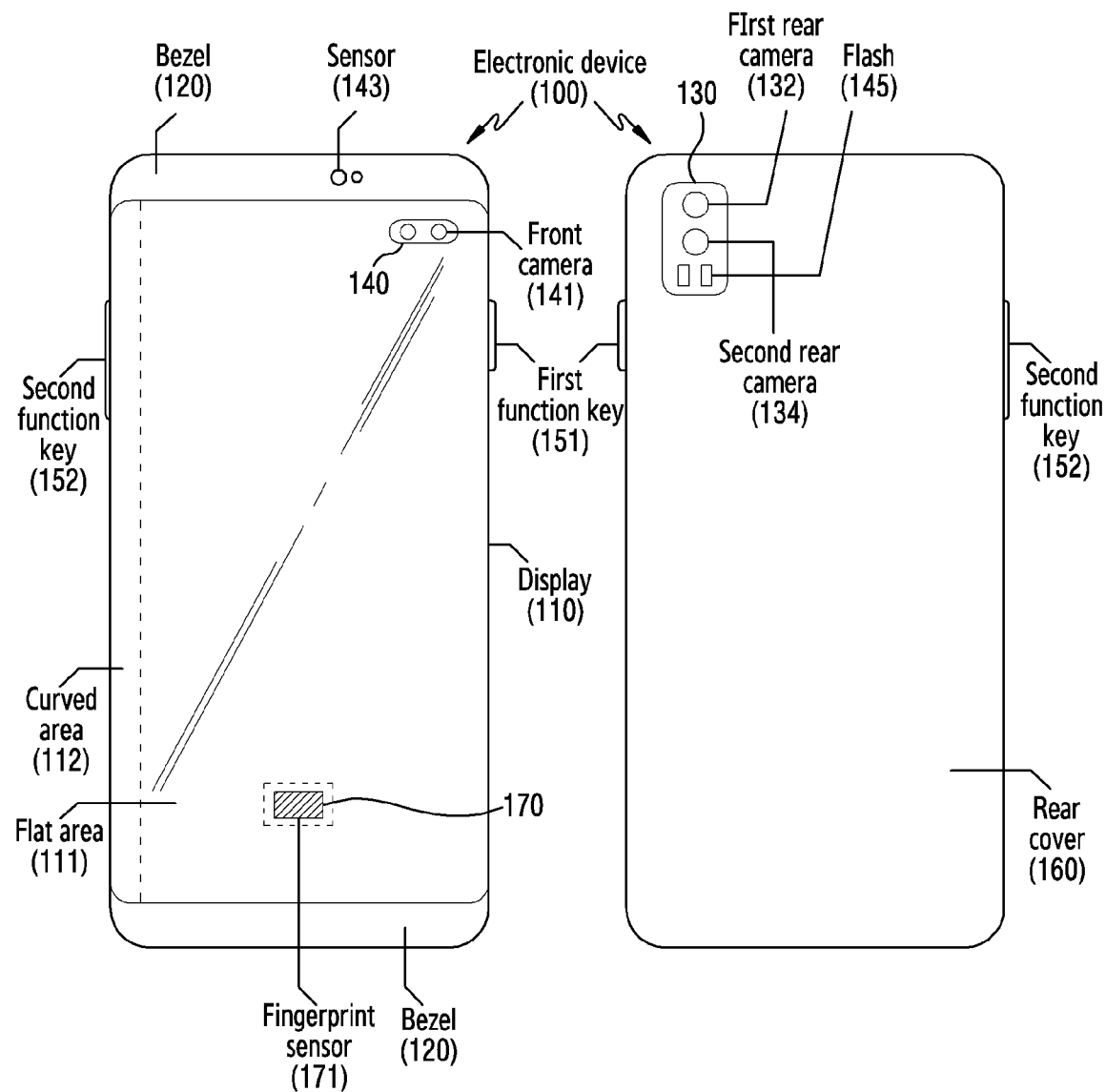
FIG. 1 illustrates an electronic device according to an embodiment.

FIG. 1 illustrates an electronic device according to an embodiment.

Referring to FIG. 1, a display 110 may be disposed on a front surface of the electronic device 100 of an embodiment. In an embodiment, the display 110 may occupy most of the front surface of the electronic device 100. The display 110 and a bezel 120 region surrounding at least some edges of the display 110 may be disposed on the front surface of the electronic device 100. In an example of FIG. 1, the display 110 may include a flat area 111 and a curved area 112 extending from the flat area 111 toward a side surface of the electronic device 100. Although the curved area 112 is displayed only at one side (e.g., the left side) in FIG. 1, it may be understood that the curved area is also identically formed at the opposite side. Also, the electronic device 100 illustrated in FIG. 1 is one example, and various embodiments are possible. For example, the display 110 of the electronic device 100 may include only the flat area 111 without the curved area 112, or may include the curved area 112 only at one edge instead of both sides. Also, in an embodiment, the curved area may be extended to the rear surface of the electronic device 100, and thus the electronic device 100 may include an additional flat area as well.

In an embodiment, a fingerprint sensor 171 for recognizing a user's fingerprint may be included in a first area 170 of the display 110. Since the fingerprint sensor 171 is disposed on a layer below the display 110, the fingerprint sensor 171 may not be recognized by a user, or may be difficult to be recognized. Also, in addition to the fingerprint sensor 171, a sensor for additional user/biometric authentication may be disposed in a partial area of the display 110. In another embodiment, the sensor for user/biometric authentication may be disposed in one area of the bezel 120. For example, an IR sensor for iris authentication may be exposed through one area of the display 110, or may be exposed through one area of the bezel 120.

In an embodiment, a front camera 141 may be disposed on the front surface of the electronic device 100. In the embodiment of FIG. 1, the front camera 141 is shown to be exposed through one area of the display 110, but in another embodiment, the front camera 141 may be exposed through the bezel 120.

In an embodiment, the electronic device 100 may include one or more front cameras 141. For example, the electronic device 100 may include two front cameras, such as a first front camera and a second front camera. In an embodiment, the first front camera and the second front camera may be cameras of the same type having the same specifications (e.g., pixels), but the first front camera and the second front camera may be implemented as cameras of different specifications. The electronic device 100 may support a function related to a dual camera (e.g., 3D imaging, auto focus, etc.) through two front cameras.

In an embodiment, a rear camera may be disposed on the rear surface of the electronic device 100. The rear camera may be exposed through a partial area of a rear cover 160. In an embodiment, the electronic device 100 may include a plurality of rear cameras disposed in the partial area. For example, the electronic device 100 may include two or more rear cameras. For example, the electronic device 100 may include a first rear camera 132, a second rear camera 134, and optionally a third rear camera (omitted in FIG. 1). The first rear camera 132, the second rear camera 134, and the third rear camera may have different specifications. For example, whether the first rear camera 132 and the second rear camera 134 and/or the third rear camera support FOV, pixel, aperture, and optical zoom/digital zoom, whether an image stabilization function is supported, the type and arrangement of lens sets included in each camera, or the like may be different from each other. For example, the first rear camera 132 may be a general camera, the second rear camera 134 may be a wide camera, and the third rear camera may be a tele camera. For another example, the first rear camera 132 may be a wide camera, the second rear camera 134 may be an ultrawide camera, and the third rear camera may be a tele camera. In the present disclosure, a description of functions or characteristics of the front camera may be applied to the rear camera, and vice versa.

In an embodiment, various hardware or sensors assisting photographing, such as a flash 145, may be additionally disposed in a first camera module 130. For example, a distance sensor (e.g., a TOF sensor), etc. for detecting a distance between the subject and the electronic device 100 may be further included.

In an embodiment, at least one physical key may be disposed on a side portion of the electronic device 100. For example, a first function key 151 for turning on/off the display or turning on/off the power of the electronic device 100 may be disposed at the right edge of the front surface of the electronic device 100. In an embodiment, a second function key 152 for controlling a volume or screen brightness, etc. of the electronic device 100 may be disposed at the left edge of the front surface of the electronic device 100. In addition to this, additional buttons or keys may be also disposed on the front surface or rear surface of the electronic device 100. For example, a physical button or touch button mapped to a specific function may be disposed in a lower region of the front bezel 120.

The electronic device 100 illustrated in FIG. 1 corresponds to one example, and does not limit the shape of the device to which a technical idea disclosed in the present disclosure is applied. For example, by employing the flexible display 110 and a hinge structure, the technical idea of the present disclosure may be applied to a foldable electronic device that is foldable in a horizontal direction or is foldable in a vertical direction, a tablet, or a notebook computer. Also, the present technical idea may be applied even when it is possible to arrange the first camera module 130 and the second camera module 140 facing the same direction to face different directions through rotation, folding, deformation, etc. of the device.

Figure 2:
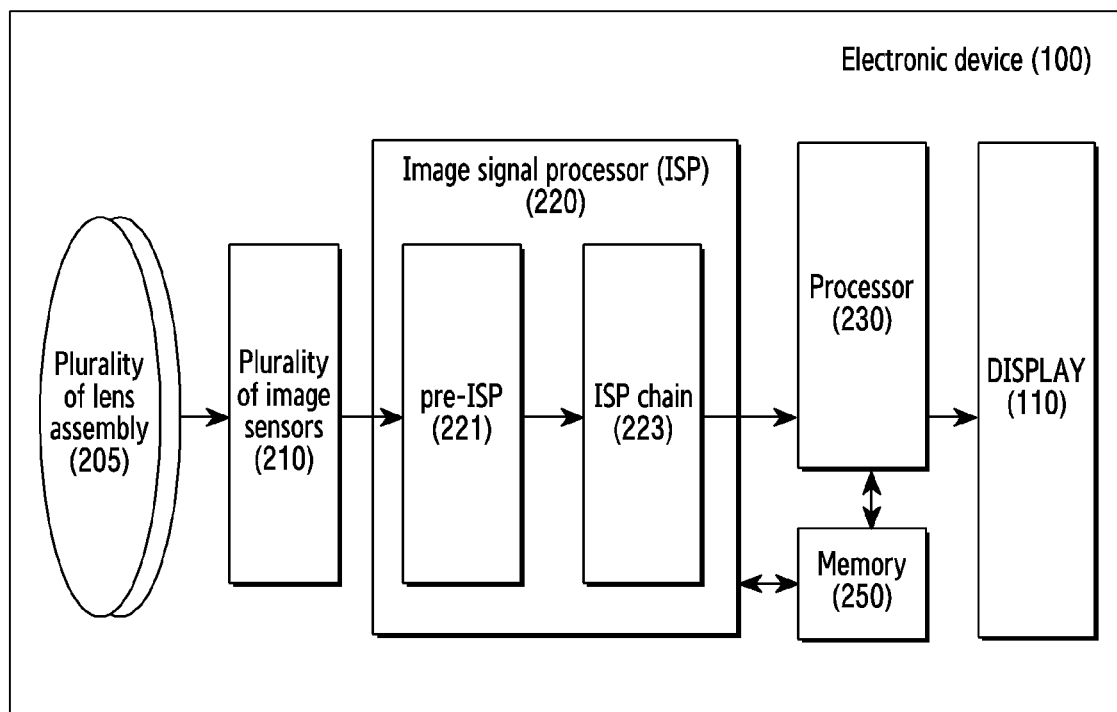
FIG. 2 illustrates a hardware and software construction of an electronic device according to an embodiment.

FIG. 2 illustrates a hardware and software construction of an electronic device according to an embodiment.

Referring to FIG. 2, in an embodiment, the electronic device 100 may include a plurality of lens assemblies 205, a plurality of image sensors 210, an image signal processor (ISP) 220, a pre-ISP 221, an ISP chain 223, a processor 230, a display 110, and a memory 250. In a description of FIG. 2, a description of the same reference numerals as those of FIG. 1 may be omitted.

In an embodiment, the plurality of cameras including the first rear camera 132 and the second rear camera 134 may include the plurality of lens assemblies 205 and the plurality of image sensors 210. This may be equally applied to the front camera 141. In an embodiment, the number, arrangement, type, etc. of the plurality of lens assemblies may be different from each other. The cameras may have different characteristics (e.g., a focal length, a maximum magnification, etc.) depending on the type of the lens assembly.

In an embodiment, the plurality of image sensors 210 may include a complementary metal oxide semiconductor (CMOS) sensor or a charged coupled device (CCD) sensor. Light information of the subject incident through the plurality of lens assemblies 205 may be converted into electrical signals by the plurality of image sensors 210 and be inputted to the image signal processor 220. Infra-red cut filters (hereinafter, IR cut filters) may be disposed on upper surfaces of the plurality of image sensors 210, and an image of the subject passing through the lens may be partially filtered by the IR cut filter and then be detected by the sensor.

In an embodiment, 3A processing may be performed in the pre-ISP 221 block. The 3A may include auto white balance (AWB), auto exposure (AE), and auto focusing (AF). In an embodiment, in the pre-ISP 221 block, image processing may be performed using a phase difference of optical information.

In an embodiment, in the ISP chain 223 block, at least one of lens shading correction, dead pixel correction, noise adjustment, tone curve adjustment, edge enhancement, and demosaic may be performed.

In an embodiment, the display 110 may display an execution screen of an application executed by the processor 230 or contents such as an image/video stored in the memory 250. Also, image data acquired through the camera may be displayed on the display 110 in real time.

In an embodiment, the display 110 may be implemented integrally with a touch panel. The display 110 may support a touch function, and may detect a user input such as a touch using a finger and transmit it to the processor 230. The display 110 may be connected to a display driver integrated circuit (DDIC) for driving the display 110, and the touch panel may be connected to a touch IC that detects a touch coordinate and processes a touch-related algorithm. In an embodiment, the display driving circuit and the touch IC may be integrally formed, and in another embodiment, the display driving circuit and the touch IC may be formed separately. The display driving circuit and/or the touch IC may be electrically connected to the processor 230.

In an embodiment, the processor 230 may execute/control various functions supported by the electronic device 100. For example, the processor 230 may execute an application by executing a code written in a programming language stored in the memory 250, and may control various hardware. For example, the processor 230 may execute an application supporting a photographing function stored in the memory 250. Also, the processor 230 may execute the first camera module 130 or the second camera module 140, and may set up and support an appropriate photographing mode wherein the first camera module 130 or the second camera module 140 may perform an operation intended by a user.

In an embodiment, the memory 250 may store instructions executable by the processor 230. The memory 250 may be understood as a concept including a component in which data is temporarily stored, such as a random-access memory (RAM), and/or a component in which data is permanently stored, such as a solid-state drive (SSD). For example, the processor 230 may implement a software module in a RAM space by calling instructions stored in the SSD. In various embodiments, the memory 250 may include various types, and an appropriate type may be adopted according to a purpose of the device.

In an embodiment, applications associated with the first camera module 130 and the second camera module 140 may be stored in the memory 250. For example, a camera application may be stored in the memory 250. The camera application may support various photographing functions, such as photo shooting, video shooting, panoramic shooting, and slow motion shooting.

In an embodiment, the applications associated with the first camera module 130 and the second camera module 140 may correspond to various types of applications. For example, a chatting application, a web browser application, an email application, a shopping application, etc. may also use the first camera module 130 and the second camera module 140 in order to support a video call, photo/video attachment, streaming service, product image, or product-related virtual reality (VR) photographing function.

The components illustrated in FIG. 2 are exemplary, and the electronic device 100 may further include additional components. For example, the electronic device 100 may further include at least one microphone for recording audio data. Also, for example, the electronic device 100 may include at least one sensor for determining a direction in which the front surface or rear surface of the electronic device 100 faces and/or posture information of the electronic device 100. In an embodiment, the at least one sensor may include an acceleration sensor, a gyro sensor, or the like. A detailed description of hardware that is included or may be included in the electronic device 100 of FIG. 2 is presented with reference to FIG. 8 and FIG. 9.

Figure 3:
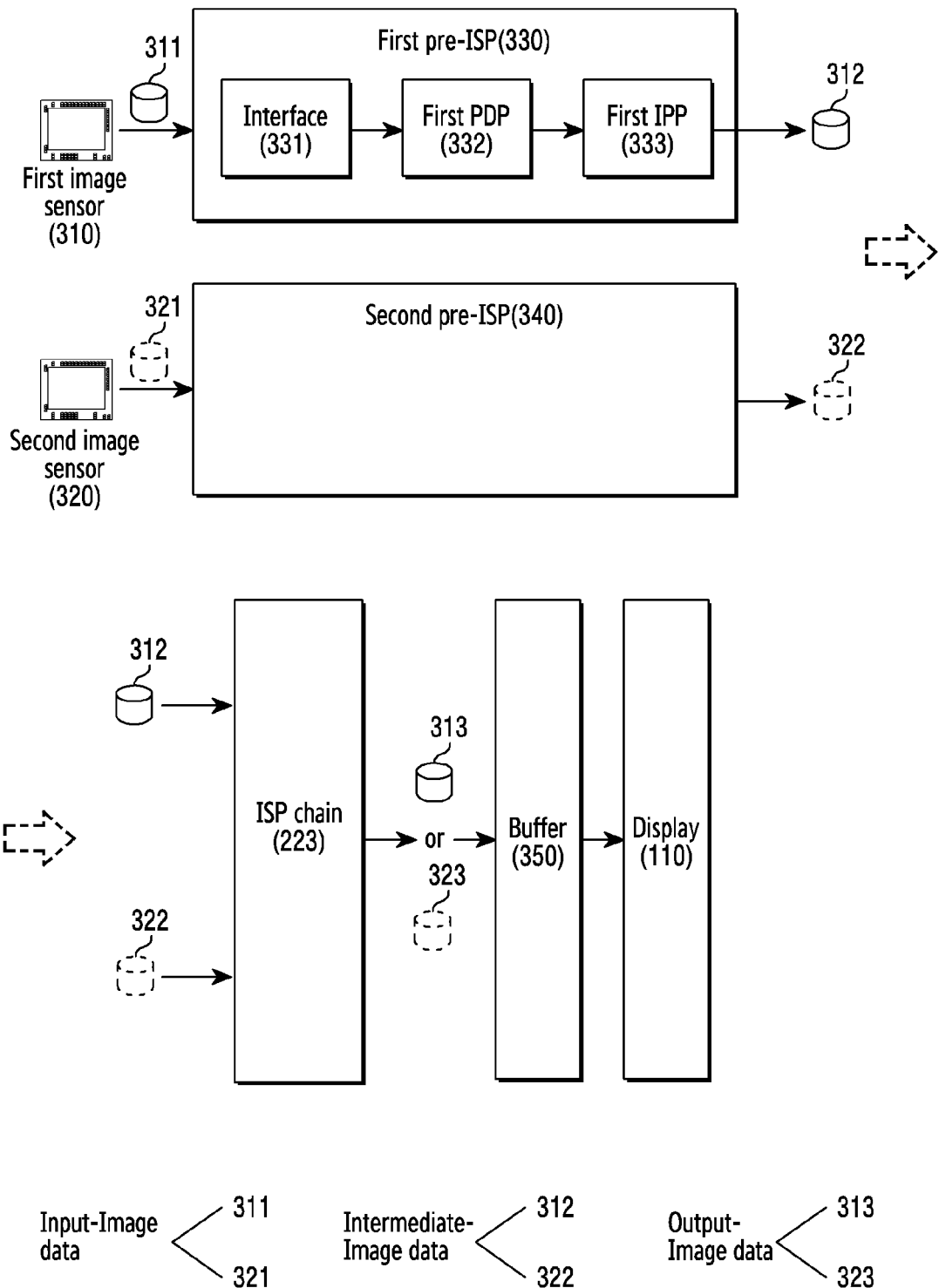
FIG. 3 illustrates a pipeline of an image signal processor when there are two cameras in an electronic device according to an embodiment.

FIG. 3 illustrates a pipeline of an image signal processor when there are two cameras in an electronic device according to an embodiment.

In an embodiment, the pipeline of the image signal processor 220 may include pre-ISPs 330 and 340 and an ISP chain 223.

In an embodiment, the first pre-ISP 330 may include an interface 331, a first phase difference processing (PDP) 332 block, and a first image pre-processing (IPP) 333 block.

In an embodiment, the interface 331 may be a mobile industry processor interface (MIPI). The interface 331 may function to forward image data 311 outputted from an image sensor 310, to the first PDP 332 block. In the first PDP 332 block, image processing may be performed using a phase difference of wavelengths acquired through stacked photodiodes. In the first IPP 333 block, 3A, that is, auto white balance (AWB), auto exposure (AE), and auto focusing (AF) may be performed. The construction and operation of the second pre-ISP 340 may be applied in the same manner as that of the first pre-ISP 330.

In an embodiment, the processor 230 may acquire image data 311 through the first image sensor 310. The processor 230 may acquire image data 321 through a second image sensor 320. The image data 311 and the image data 321 may be referred to as input-image data or raw image data.

In an embodiment, the image data 311 may be sequentially forwarded to the first PDP 332 block, the first IPP 333 block, and the ISP chain 223 through the specified interface 331, for the sake of image processing. This may be equally applied to the image data 321.

In an embodiment, the processor 230 may maintain a resolution of image data in a hardware block associated with image quality. For example, the processor 230 does not change the resolution of image data up to hardware blocks corresponding to the interface 331, the first PDP 332 block, and the first IPP 333 block, and may change the resolution of image data from a next block of the first IPP 333. For example, the processor 230 may downscale a resolution of image data after the ISP chain 223. For another example, the processor 230 may control to downscale a resolution of image data on which image processing is performed in the first IPP block 333. The image pre-processing (IPP) block may be a block taking charge of image processing performed before the ISP chain 223. In the IPP block 333, auto focus, auto exposure, and auto white balance may be performed, and the scale of an image may be adjusted. Also, in the IPP block, a function such as motion estimation or dynamic range compression (DRC), etc. may be performed. The above functions of the IPP block may be additionally performed in the ISP chain 223.

In an embodiment, the processor 230 may display image data acquired through the first image sensor 310 on the display 110. In this case, the processor 230 may set a resolution of the image data 322 to be lower than a resolution of the image data 312. For example, when the processor 230 determines to display image data acquired through the first image sensor 310 on the display 110, power consumption may be reduced by lowering a resolution of the image data acquired through the second image sensor 320 of a stand-by state. The image data 312 and the image data 322 may be referred to as intermediate-image data.

In an embodiment, the processor 230 may display image data acquired through the second image sensor 320, on the display 110. In this case, the processor 230 may set a resolution of the image data 312 to be lower than a resolution of the image data 322. For example, when the processor 230 determines to display image data acquired through the second image sensor 320 on the display 110, power consumption may be reduced by lowering a resolution of the image data acquired through the first image sensor 310 of a stand-by state.

In an embodiment, the processor 230 may temporarily store the image data 313 or 323 determined to be displayed on the display 110, in the buffer 350, and then display the image data 313 or 323 on the display 110. The image data 313 and the image data 323 may be referred to as output-image data.

Figure 4:
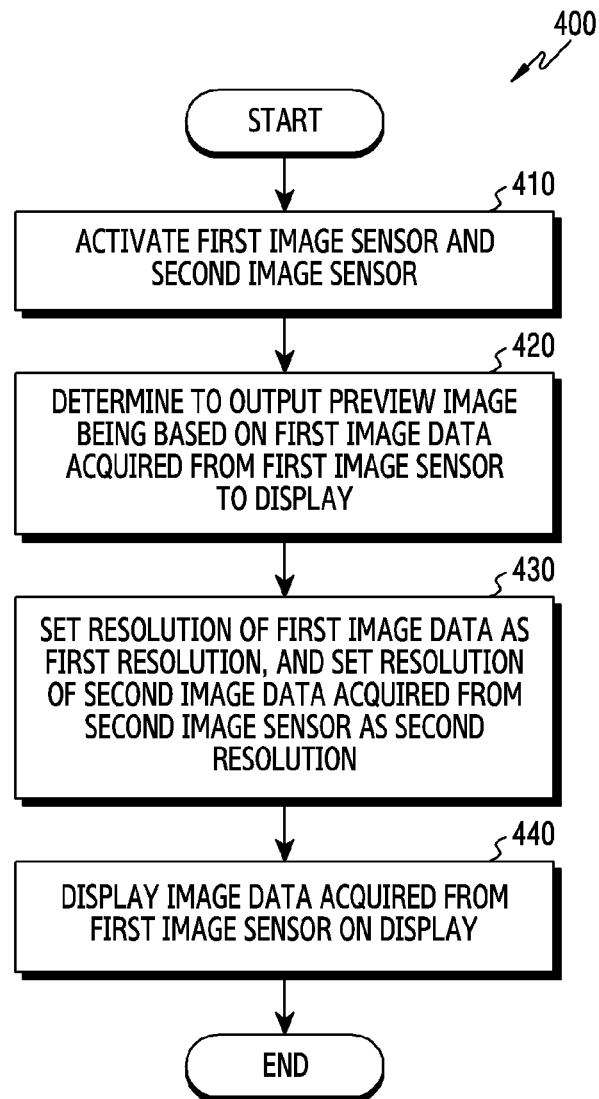
FIG. 4 is a flowchart illustrating setting of a resolution of image data in a pipeline of an image signal processor in an electronic device according to an embodiment.

FIG. 4 is a flowchart 400 illustrating setting of a resolution of image data passing through a pipeline of an image signal processor in an electronic device according to an embodiment.

An operating subject of the flowchart 400 illustrated in FIG. 4 may be understood as a processor (e.g., the processor 230 of FIG. 2) or an image signal processor (e.g., the image signal processor 220 of FIG. 2).

According to an embodiment, in operation 410, the processor 230 may activate the first image sensor 310 and the second image sensor 320. The processor 230 may activate the first image sensor 310 and the second image sensor 320 in response to a user input on zoom magnification or acquiring environmental information of a camera. Here, the camera may include the first rear camera 132 and the second rear camera 134. The processor 230 may acquire first image data by activating the first image sensor 310, and acquire second image data by activating the second image sensor 320. Here, the "first image data" may correspond to the image data 311, 312 and 313 in FIG. 3, and the "second image data" may correspond to the image data 321, 322 and 323 in FIG. 3.

In an embodiment, the processor 230 may set a resolution of the first image data and a resolution of the second image data to be the same resolution, until determining whether to display a preview based on image data acquired through which image sensor of the first image sensor 310 and the second image sensor 320.

According to an embodiment, in operation 420, the processor 230 may determine to output a preview image that is based on the first image data acquired from the first image sensor 310, to a display.

In an embodiment, an end event for a user input on zoom magnification or acquiring environmental information of the camera may occur. In response to the end event, the processor 230 may determine to output the preview image that is based on the first image data acquired from the first image sensor 310, to the display.

Figure 5:
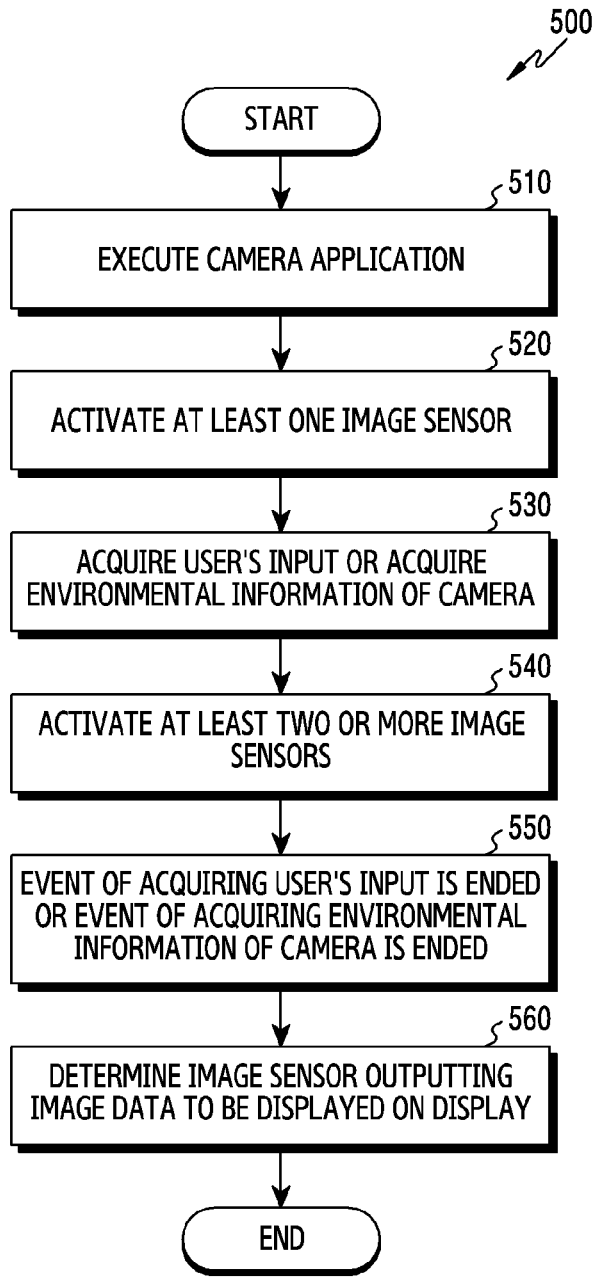
FIG. 5 is a flowchart illustrating a process of determining an image sensor that outputs image data to be displayed on a display in an electronic device according to an embodiment.

A detailed description of operation 410 and operation 420 may be made with reference to FIG. 5.

According to an embodiment, in operation 430, when the processor 230 determines to output the preview image that is based on the first image data acquired from the first image sensor 310 to the display 110, the processor 230 may set a resolution of the first image data acquired from the first image sensor 310 as a first resolution, and may set a resolution of the second image data acquired from the second image sensor 320 as a second resolution. The second resolution may be lower than the first resolution.

In an embodiment, the processor 230 may display the image data acquired through the first image sensor 310 on the display 110. In this case, the processor 230 may set a resolution of the image data 322 to be lower than a resolution of the image data 312. For example, when the processor 230 determines to display the image data acquired through the first image sensor 310 on the display 110, the processor 230 may reduce power consumption by lowering the resolution of the image data acquired through the second image sensor 320 of a stand-by state. For example, the resolution of the image data 312 may be 4000×3000, and the resolution of the image data 322 may be 2000×1500. This is only one example, and the resolution of the image data 322 may be variously set within a range lower than the resolution of the image data 312.

In an embodiment, the processor 230 may display the image data acquired through the first image sensor 310 on the display 110. In this case, the processor 230 may set a resolution of the image data 321 to be lower than a resolution of the image data 311. For example, when the processor 230 determines to display the image data acquired through the first image sensor 310 on the display 110, the processor 230 may reduce power consumption by lowering the resolution of the image data acquired through the second image sensor 320 of a stand-by state. For example, the resolution of the image data 311 may be 4000×3000, and the resolution of the image data 321 may be 2000×1500. This is only one example, and the resolution of the image data 321 may be variously set within a range lower than the resolution of the image data 311.

According to an embodiment, in operation 440, the processor 230 may display the image data acquired from the first image sensor 310 on the display 110. The processor 230 may display a preview image that is based on the acquired image data on the display 110. The processor 230 may downscale the acquired image data suitably to a resolution of the display 110 and display the preview image on the display 110. For example, when the resolution of the display 110 is 1440×1080, the processor 230 may downscale image data having a resolution of 4000×3000 acquired from the first image sensor 310 and display a preview image having a resolution of 1440×1080 on the display 110.

In an embodiment, while the processor 230 displays a preview image that is based on the first image data on the display 110, the processor 230 may continuously acquire the second image data acquired through the second image sensor 320. The processor 230 may temporarily store the continuously acquired second image data in the memory 250.

In an embodiment, the processor 230 may capture an image in response to a user's photographing input. The processor 230 may capture a preview image displayed through the display 110 in response to the user's photographing input. The user's photographing input may include user's pressing a physical photographing button, pressing a virtual photographing button on a display, a photographing input through a voice recognition function, etc. The preview image by the user may be a still picture or a moving picture.

FIG. 5 is a flowchart 500 illustrating a process of determining an image sensor that outputs image data to be displayed on a display in an electronic device according to an embodiment.

An operating subject of the flowchart 500 illustrated in FIG. 5 may be understood as a processor (e.g., the processor 230 of FIG. 2) or an image signal processor (e.g., the image signal processor 220 of FIG. 2).

According to an embodiment, in operation 510, the processor 230 may execute a camera application. The processor 230 may execute the camera application in response to a user input of executing a camera. The input for executing the camera application may be performed in a method of touching an application icon through a touch screen, a method of pressing a function key (e.g., the first function key 151 or the second function key 152 of FIG. 1), and/or a method of using a voice recognition function (e.g., Bixby).

According to an embodiment, in operation 520, the processor 230 may activate at least one image sensor. The processor 230 may acquire image data from the activated at least one image sensor.

In an embodiment, when the camera application is executed, the processor 230 may output an execution screen of the camera application to the display 110. When the camera application is executed, the processor 230 may activate an image sensor of a camera initially set to the camera application. In an embodiment, image data acquired by the image sensor activated together with the execution of the camera application may be displayed on the display 110. For example, when a default zoom magnification is 1.0×, the processor 230 may acquire image data through an image sensor of a camera corresponding thereto and display the acquired image data on the display 110.

In an embodiment, the processor 230 may continuously display the image data acquired by the initially set camera (e.g., wide camera) on the display 110 until an event of a user's zoom input or an event for acquiring environmental information of the camera occurs.

According to an embodiment, in operation 530, the processor 230 may acquire a user input additionally or acquire environmental information of a camera.

In an embodiment, the processor 230 may acquire a user input for a zoom event. The processor 230 may acquire the user input for the zoom event through a touch sensor of a touch display. The user input may correspond to any one of a finger-zoom input, a progress-bar zoom input, a zoom-button input, or a zoom control through a voice recognition function, which is performed in the camera application. The finger-zoom input may include an operation of making farther or closer a state in which two fingers are touched on the display 110 or a distance between the two fingers so as to enlarge or reduce a magnification. The progress-bar input may be an input for a bar dragged by a user's finger. The zoom-button input may be a user input for selecting a zoom magnification in camera settings or a user input for selecting a zoom magnification by touching a zoom icon displayed on a preview.

In an embodiment, the processor 230 may acquire environmental information from each of cameras. The environmental information may include brightness information, distance information, focus information, or the like. The brightness information may include an illuminance value. The distance information may include a distance from a camera to an object. The focus information may be focus information that uses an auto focus function of the camera.

According to an embodiment, in operation 540, the processor 230 may activate at least two or more image sensors. The processor 230 may activate all image sensors when acquiring a user input or acquiring environmental information of a camera. For example, when the electronic device 100 is equipped with a multi-camera on the rear side, all of image sensors of the multi-camera may be activated. When the electronic device 100 is equipped with a triple camera on the rear side, image sensors of the triple camera may be activated. This may be equally applied even when there are four or more cameras.

In an embodiment, when the processor 230 activates all the image sensors, the processor 230 may set resolutions of image data acquired from all the image sensors to be the same resolution.

In an embodiment, the processor 230 may acquire image data from all the image sensors activated through a pipeline of an image signal processor. While acquiring the image data from all the activated image sensors, the processor 230 may display image data acquired from one image sensor corresponding to current photographing information among the activated image sensors, on the display 110. For example, when the processor 230 acquires image data from all the image sensors and a zoom magnification is 1.2× (1.2 times) by a user's finger-zoom, the processor 230 may display image data acquired from an image sensor of a wide camera on the display 110, and when the zoom magnification is changed to 2.5× by the finger-zoom that is still working, the processor 230 may display image data acquired from an image sensor of a tele camera on the display 110. For another example, when the zoom magnification is changed to 0.6× from 1.0× by the finger-zoom that is still working, the processor 230 may display image data acquired from an image sensor of a ultrawide camera on the display 110. That is, the processor 230 may change the camera having the image sensor acquiring the image data to be displayed, according to the zoom magnification range covered by each camera.

According to an embodiment, in operation 550, the event of acquiring the user input may end or the event of acquiring the environmental information of the camera may end.

In an embodiment, the event of acquiring the user input may be ended. The ending of acquiring the user input may include the releasing of a user's finger-zoom input, a progress-bar zoom input, a zoom-button input, or a zoom control through a voice recognition function. For example, the ending of acquiring the user input may include a case in which a finger for a zoom input is removed from a touch screen or the zoom input is completed through the voice recognition function.

In an embodiment, the event of acquiring the environmental information of the camera may be ended. When a change of a brightness value acquired through the camera, a change of focus information, or a change of a distance to an object is not detected, the processor 230 may determine that the event of acquiring the environmental information of the camera has ended.

According to an embodiment, in operation 560, the processor 230 may determine image data that will be outputted to the display 110.

In an embodiment, when the event of acquiring the user input is ended or the event of acquiring the environmental information of the camera is ended, the processor 230 may acquire photographing information (e.g., zoom magnification, brightness, focus information, etc.) that is set at the ending time of the event. The processor 230 may determine a camera corresponding to the set photographing information. The processor 230 may display image data acquired from an image sensor of the determined camera, on the display 110. For example, when a zoom magnification is 1.2× at a time point when the event is ended, the processor 230 may display image data acquired from an image sensor of a wide camera, on the display 110. For another example, when an illuminance value is a high illuminance at a time point when the event is ended, the processor 230 may display image data acquired from an image sensor of a tele camera, on the display 110. For further example, when a distance value of an object acquired from at least one camera is a far distance at a time point when the event is ended, the processor 230 may display image data acquired from an image sensor of a tele camera, on the display 110.

However, examples are not limited to the above description, and the fact that a camera outputting image data that will be displayed on a display may be determined by comprehensively considering a zoom magnification, an illuminance value, a focus value, etc. may be understood at a level of an ordinary person skilled in the art.

Figure 6:
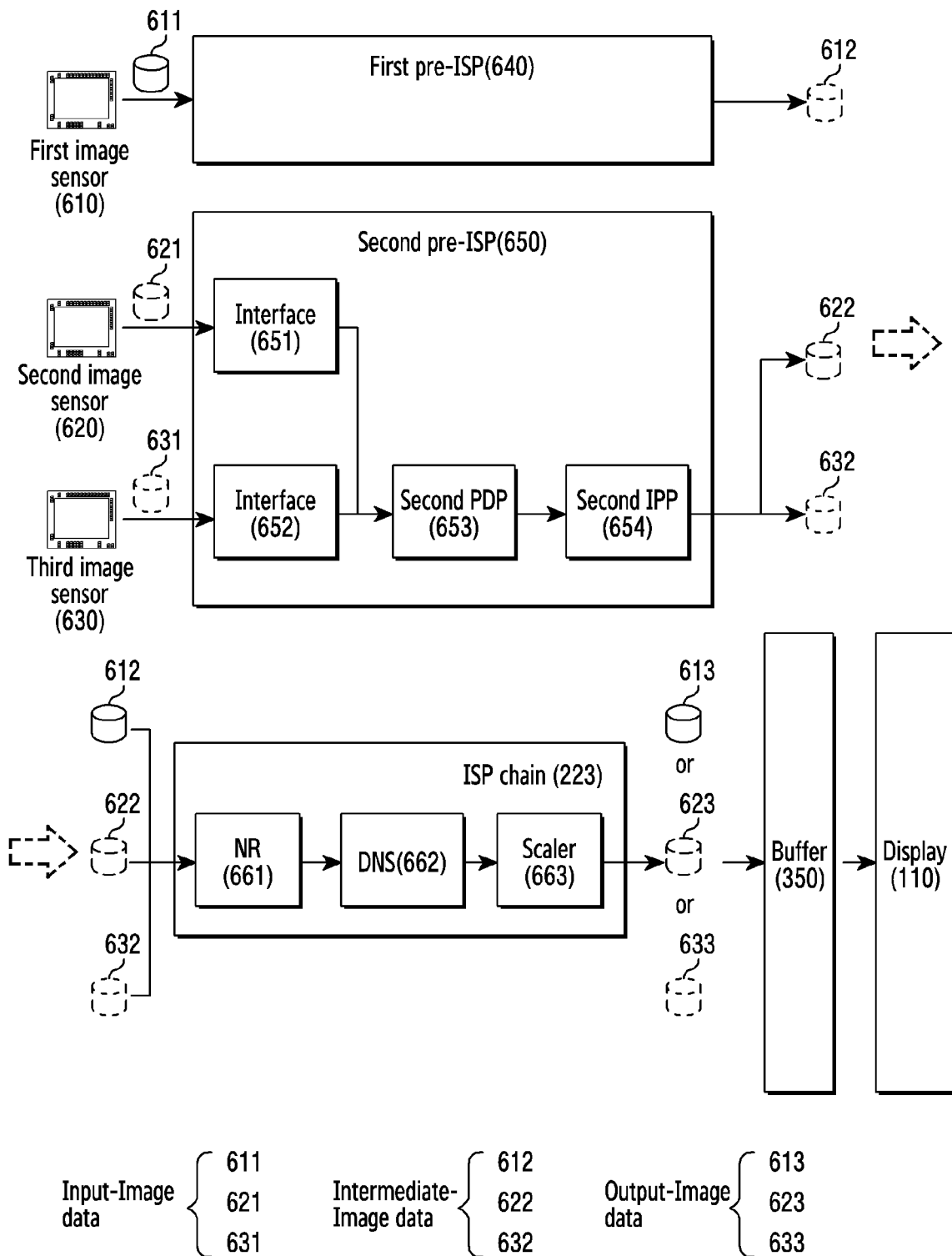
FIG. 6 illustrates a pipeline of an image signal processor when there are three cameras in an electronic device according to an embodiment.

FIG. 6 illustrates a pipeline of an image signal processor when there are three cameras in an electronic device according to an embodiment.

An operating subject of the flowchart 600 illustrated in FIG. 6 may be understood as a processor (e.g., the processor 230 of FIG. 2) or an image signal processor (e.g., the image signal processor 220 of FIG. 2).

The first image sensor 610 and the second image sensor 620 illustrated in FIG. 6 may correspond to the first image sensor 310 and the second image sensor 320 illustrated in FIG. 3, respectively. A first pre-ISP 640 illustrated in FIG. 6 may correspond to the first pre-ISP 330 illustrated in FIG. 3. Image data 611, 612, and 613 acquired through the first image sensor 610 may correspond to the image data 311, 312, and 313 acquired through the first image sensor 310. Also, image data 621, 622, and 623 acquired through the second image sensor 620 may correspond to the image data 321, 322, and 323 acquired through the second image sensor 320. Hereinafter, in a description of FIG. 6, a description of the same reference numerals as those of FIG. 3 may be omitted.

In an embodiment, image data 621 acquired through the second image sensor 620 and image data 631 acquired through the third image sensor 630 may pass through an interface 651 and an interface 652, respectively. The image data 611, the image data 621, and the image data 631 may be referred to as input-image data or raw image data.

In an embodiment, the image data 621 and the image data 631 may share a second PDP 653 block and a second IPP 654 block. In other words, the image data 621 and the image data 631 may be image-processed through the second PDP 653 block and the second IPP 654 block.

In an embodiment, the image data 621 and the image data 631 may be image-processed through separate pre-ISP blocks, respectively. In other words, the image data 621 and the image data 631 may be image-processed through a separate interface, a separate PDP block, and a separate IPP block, respectively.

In an embodiment, the image data 621 and the image data 631 may be image-processed through a shared PDP block, and then may be image-processed through a separate independent IPP block.

In an embodiment, the image data 621 and the image data 631 may be image-processed through separate independent PDP blocks, and then may be image processed through a shared IPP block.

In an embodiment, an ISP chain 223 may include a noise reduction (NR) block 661, a denoise (DNS) block 662, and a scaler 663.

In an embodiment, the processor 230 may display the image data acquired through the first image sensor 610, on the display 110. In this case, the processor 230 may set each of a resolution of the image data 622 and a resolution of the image data 632 to be lower than a resolution of the image data 612. For example, when the processor 230 determines that the image data acquired through the first image sensor 610 is displayed on the display 110, the processor 230 may lower the resolution of the image data acquired through the second image sensor 620 and third image sensor 630 of a stand-by state, to reduce power consumption. The image data 612, the image data 622, and the image data 632 may be referred to as intermediate-image data.

In an embodiment, the processor 230 may display the image data acquired through the second image sensor 620, on the display 110. In this case, the processor 230 may set the resolution of the image data 612 and the resolution of the image data 632 to be lower than the resolution of the image data 622. For example, when the processor 230 determines to display the image data acquired through the second image sensor 620 on the display 110, the processor 230 may lower the resolution of the image data acquired through the first image sensor 610 and third image sensor 630 of a stand-by state, to reduce power consumption.

In an embodiment, the processor 230 may display the image data acquired through the third image sensor 630, on the display 110. In this case, the processor 230 may set the resolution of the image data 612 and the resolution of the image data 622 to be lower than the resolution of the image data 632. For example, when the processor 230 determines to display the image data acquired through the third image sensor 630 on the display 110, the processor 230 may lower the resolution of the image data acquired through the first image sensor 610 and second image sensor 620 of a stand-by state, to reduce power consumption. In an embodiment, the processor 230 may temporarily store the image data 613, 623 or 633 determined to be displayed on the display 110, in the buffer 350, and then display the image data 613, 623 or 633 on the display 110. The image data 613, the image data 623 and the image data 633 may be referred to as output-image data.

According to an embodiment, the processor 230 may deactivate at least one image sensor. When the processor 230 determines to display the image data acquired through the first image sensor 610 on the display 110, the processor 230 may deactivate the second image sensor 620 or the third image sensor 630, to reduce power consumption. For example, when the processor 230 determines to display image data acquired through a tele camera on the display 110, the processor 230 may deactivate an image sensor of an ultrawide camera. This may also be applied in the opposite case.

Figure 7:
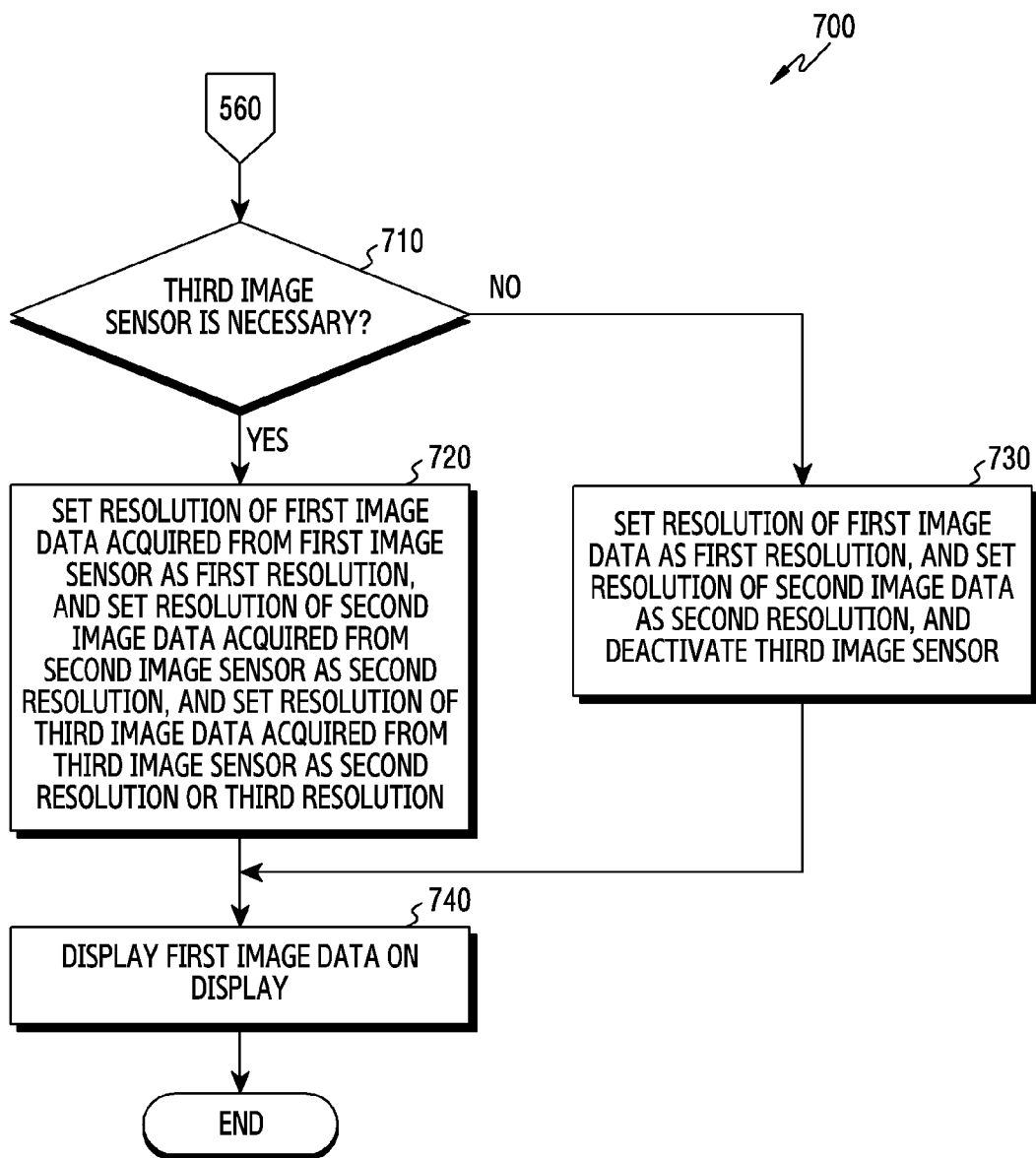
FIG. 7 is a flowchart illustrating image processing when there are three cameras in an electronic device according to an embodiment.

FIG. 7 is a flowchart 700 illustrating image processing when there are three cameras in an electronic device according to an embodiment.

An operating subject of the flowchart 700 illustrated in FIG. 7 may be understood as a processor (e.g., the processor 230 of FIG. 2) or an image signal processor (e.g., the image signal processor 220 of FIG. 2). Also, the flowchart illustrated in FIG. 7 may be equally applied even when the number of cameras exceeds three.

FIG. 7 may be performed after operation 560 of FIG. 5. Accordingly, the description related to FIG. 5 may be also applied to FIG. 7 in the same or corresponding manner. In other words, FIG. 7 is a diagram illustrating a process of, after determining image data to be outputted to a display, determining whether the third image sensor 630 is necessary, and adjusting a resolution of the image data.

According to an embodiment, in operation 710, the processor 230 may determine whether the third image sensor 630 is necessary. For example, whether the third image sensor 630 is necessary may be determined by a functional relationship between the current camera used to display the preview image and the third image sensor 630.

In an embodiment, the processor 230 may determine that the third image sensor is unnecessary. For example, when the processor 230 determines that a camera used to display a preview image on the display 110 is a tele camera, the processor 230 may determine that the third image sensor included in an ultrawide camera is unnecessary. For example, when the camera application operates the zoom magnification to change continuously (e.g., decreases continuously) and the current camera used to display the preview image is the tele camera, the immediately next camera to be used to display a next preview image when decreasing the zoom magnification is the wide camera, not the ultrawide camera, due to zoom magnification range covered by each camera. Therefore, the processor 230 may determine that the third image sensor included in an ultrawide camera is unnecessary while determining that the third image sensor included in a wide camera is necessary. For another example, when the processor 230 determines that the camera used to display the preview image on the display 110 is an ultrawide camera, the processor 230 may determine that the third image sensor included in a tele camera is unnecessary.

In an embodiment, the processor 230 may determine that the third image sensor is necessary. For example, when the processor 230 determines that the camera used to display the preview image on the display 110 is a wide camera, the processor 230 may determine that the third image sensor included in an ultrawide camera is necessary. For another example, when the processor 230 determines that the camera used to display the preview image on the display 110 is a wide camera, the processor 230 may determine that the third image sensor included in a tele camera is necessary.

When the processor 230 determines that the third image sensor is necessary in operation 710 of an embodiment, operation 720 may be performed, and when the processor 230 determines that the third image sensor is not necessary, operation 730 may be performed.

According to an embodiment, in operation 720, the processor 230 may set a resolution of first image data acquired from the first image sensor 610 as a first resolution and set a resolution of second image data acquired from the second image sensor 620 as a second resolution, and may set a resolution of third image data acquired from the third image sensor 630 as the second resolution or a third resolution. For example, the processor 230 may set the first resolution as 4000×3000, and the second resolution and the third resolution as 2000×1500. For another example, the processor 230 may set the first resolution as 4000×3000, the second resolution as 2000×1500, and the third resolution as 2688× 2000.

In an embodiment, the processor 230 may acquire image data having the first resolution from the first image sensor. The processor 230 may acquire image data having the second resolution lower than the first resolution from the second image sensor. The processor 230 may acquire image data having the second resolution or third resolution from the third image sensor.

According to an embodiment, in operation 730, the processor 230 may set a resolution of first image data acquired from the first image sensor 610 as a first resolution, and set a resolution of second image data acquired from the second image sensor 620 as a second resolution lower than the first resolution, and may deactivate the third image sensor 630. The processor 230 may deactivate the third image sensor, to reduce power consumption and heat generation of the electronic device 100.

In an embodiment, the processor 230 may acquire image data having the first resolution from the first image sensor. The processor 230 may acquire image data having the second resolution lower than the first resolution from the second image sensor.

According to an embodiment, in operation 740, the processor 230 may display the first image data on the display 110. The first image data may be image data acquired from the camera used to display the preview image on the display 110. In an embodiment, the processor 230 may store a preview image photographed in response to a user's photographing input, in the memory 250.

Figure 8:
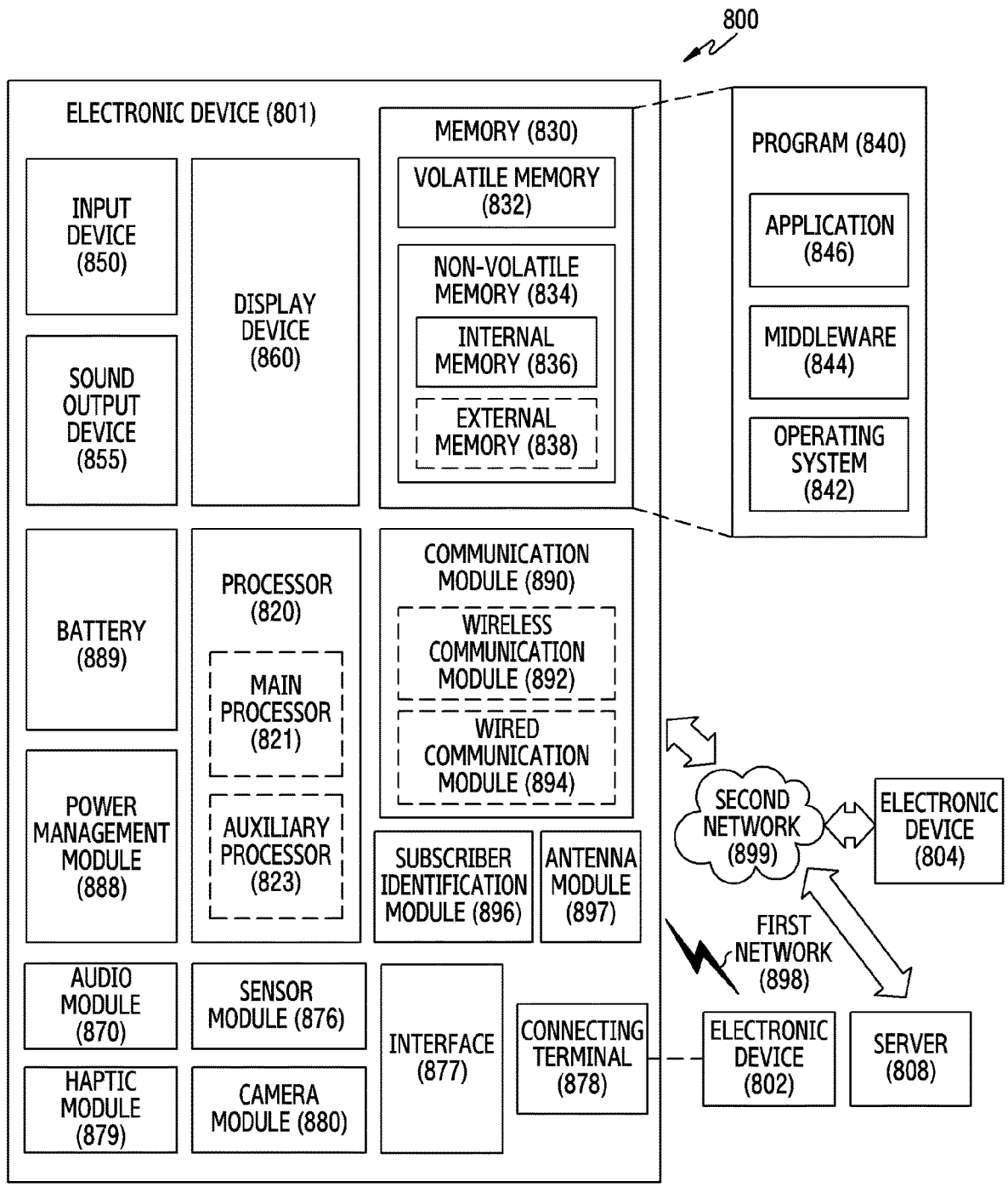
FIG. 8 is a block diagram of an electronic device in a network environment according to various embodiments.

FIG. 8 is a block diagram of an electronic device in a network environment according to various embodiments. Referring to FIG. 8, the electronic device 801 in the network environment 800 may communicate with an electronic device 802 via a first network 898 (e.g., a short-range wireless communication network), or at least one of an electronic device 804 or a server 808 via a second network 899 (e.g., a long-range wireless communication network). According to an embodiment, the electronic device 801 may communicate with the electronic device 804 via the server 808. According to an embodiment, the electronic device 801 may include a processor 820, memory 830, an input device 850, a sound output device 855, a display device 860, an audio module 870, a sensor module 876, an interface 877, a connecting terminal 878, a haptic module 879, a camera module 880, a power management module 888, a battery 889, a communication module 890, a subscriber identification module (SIM) 896, or an antenna module 897. In some embodiments, at least one of the components (e.g., the connecting terminal 878) may be omitted from the electronic device 801, or one or more other components may be added in the electronic device 801. In some embodiments, some of the components (e.g., the sensor module 876, the camera module 880, or the antenna module 897) may be implemented as a single component (e.g., the display device 860).

The processor 820 may execute, for example, software (e.g., a program 840) to control at least one other component (e.g., a hardware or software component) of the electronic device 801 coupled with the processor 820, and may perform various data processing or computation. According to one embodiment, as at least part of the data processing or computation, the processor 820 may store a command or data received from another component (e.g., the sensor module 876 or the communication module 890) in volatile memory 832, process the command or the data stored in the volatile memory 832, and store resulting data in non-volatile memory 834. According to an embodiment, the processor 820 may include a main processor 821 (e.g., a central processing unit (CPU) or an application processor (AP)), or an auxiliary processor 823 (e.g., a graphics processing unit (GPU), a neural processing unit (NPU), an image signal processor (ISP), a sensor hub processor, or a communication processor (CP)) that is operable independently from, or in conjunction with, the main processor 821. For example, when the electronic device 801 includes the main processor 821 and the auxiliary processor 823, the auxiliary processor 823 may be adapted to consume less power than the main processor 821, or to be specific to a specified function. The auxiliary processor 823 may be implemented as separate from, or as part of the main processor 821.

The auxiliary processor 823 may control at least some of functions or states related to at least one component (e.g., the display device 860, the sensor module 876, or the communication module 890) among the components of the electronic device 801, instead of the main processor 821 while the main processor 821 is in an inactive (e.g., sleep) state, or together with the main processor 821 while the main processor 821 is in an active state (e.g., executing an application). According to an embodiment, the auxiliary processor 823 (e.g., an image signal processor or a communication processor) may be implemented as part of another component (e.g., the camera module 880 or the communication module 890) functionally related to the auxiliary processor 823. According to an embodiment, the auxiliary processor 823 (e.g., the neural processing unit) may include a hardware structure specified for artificial intelligence model processing. An artificial intelligence model may be generated by machine learning. Such learning may be performed, e.g., by the electronic device 801 where the artificial intelligence is performed or via a separate server (e.g., the server 808). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 830 may store various data used by at least one component (e.g., the processor 820 or the sensor module 876) of the electronic device 801. The various data may include, for example, software (e.g., the program 840) and input data or output data for a command related thereto. The memory 830 may include the volatile memory 832 or the non-volatile memory 834.

The program 840 may be stored in the memory 830 as software, and may include, for example, an operating system (OS) 842, middleware 844, or an application 846.

The input device 850 may receive a command or data to be used by another component (e.g., the processor 820) of the electronic device 801, from the outside (e.g., a user) of the electronic device 801. The input device 850 may include, for example, a microphone, a mouse, a keyboard, a key (e.g., a button), or a digital pen (e.g., a stylus pen).

The sound output device 855 may output sound signals to the outside of the electronic device 801. The sound output device 855 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display device 860 may visually provide information to the outside (e.g., a user) of the electronic device 801. The display device 860 may include, for example, a display, a hologram device, or a projector and control circuitry to control a corresponding one of the display, hologram device, and projector. According to an embodiment, the display device 860 may include a touch sensor adapted to detect a touch, or a pressure sensor adapted to measure the intensity of force incurred by the touch.

The audio module 870 may convert a sound into an electrical signal and vice versa. According to an embodiment, the audio module 870 may obtain the sound via the input device 850, or output the sound via the sound output device 855 or a headphone of an external electronic device (e.g., an electronic device 802) directly (e.g., wiredly) or wirelessly coupled with the electronic device 801.

The sensor module 876 may detect an operational state (e.g., power or temperature) of the electronic device 801 or an environmental state (e.g., a state of a user) external to the electronic device 801, and then generate an electrical signal or data value corresponding to the detected state. According to an embodiment, the sensor module 876 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 877 may support one or more specified protocols to be used for the electronic device 801 to be coupled with the external electronic device (e.g., the electronic device 802) directly (e.g., wiredly) or wirelessly.

According to an embodiment, the interface 877 may include, for example, a high-definition multimedia interface (HDMI), a universal serial bus (USB) interface, a secure digital (SD) card interface, or an audio interface.

The connecting terminal 878 may include a connector via which the electronic device 801 may be physically connected with the external electronic device (e.g., the electronic device 802). According to an embodiment, the connecting terminal 878 may include, for example, a HDMI connector, a USB connector, a SD card connector, or an audio connector (e.g., a headphone connector).

The haptic module 879 may convert an electrical signal into a mechanical stimulus (e.g., a vibration or a movement) or electrical stimulus which may be recognized by a user via his tactile sensation or kinesthetic sensation. According to an embodiment, the haptic module 879 may include, for example, a motor, a piezoelectric element, or an electric stimulator.

The camera module 880 may capture a still image or moving images. According to an embodiment, the camera module 880 may include one or more lenses, image sensors, image signal processors, or flashes.

The power management module 888 may manage power supplied to the electronic device 801. According to one embodiment, the power management module 888 may be implemented as at least part of, for example, a power management integrated circuit (PMIC).

The battery 889 may supply power to at least one component of the electronic device 801. According to an embodiment, the battery 889 may include, for example, a primary cell which is not rechargeable, a secondary cell which is rechargeable, or a fuel cell.

The communication module 890 may support establishing a direct (e.g., wired) communication channel or a wireless communication channel between the electronic device 801 and the external electronic device (e.g., the electronic device 802, the electronic device 804, or the server 808) and performing communication via the established communication channel. The communication module 890 may include one or more communication processors that are operable independently from the processor 820 (e.g., the application processor (AP)) and supports a direct (e.g., wired) communication or a wireless communication. According to an embodiment, the communication module 890 may include a wireless communication module 892 (e.g., a cellular communication module, a short-range wireless communication module, or a global navigation satellite system (GNSS) communication module) or a wired communication module 894 (e.g., a local area network (LAN) communication module or a power line communication (PLC) module). A corresponding one of these communication modules may communicate with the external electronic device via the first network 898 (e.g., a short-range communication network, such as Bluetooth™, wireless-fidelity (Wi-Fi) direct, or infrared data association (IrDA)) or the second network 899 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 892 may identify and authenticate the electronic device 801 in a communication network, such as the first network 898 or the second network 899, using subscriber information (e.g., international mobile subscriber identity (IMSI)) stored in the subscriber identification module 896.

The wireless communication module 892 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 892 may support a high-frequency band (e.g., the mmWave band) to achieve, e.g., a high data transmission rate. The wireless communication module 892 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 892 may support various requirements specified in the electronic device 801, an external electronic device (e.g., the electronic device 804), or a network system (e.g., the second network 899). According to an embodiment, the wireless communication module 892 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 897 may transmit or receive a signal or power to or from the outside (e.g., the external electronic device) of the electronic device 801. According to an embodiment, the antenna module 897 may include an antenna including a radiating element composed of a conductive material or a conductive pattern formed in or on a substrate (e.g., a printed circuit board (PCB)). According to an embodiment, the antenna module 897 may include a plurality of antennas (e.g., array antennas). In such a case, at least one antenna appropriate for a communication scheme used in the communication network, such as the first network 898 or the second network 899, may be selected, for example, by the communication module 890 (e.g., the wireless communication module 892) from the plurality of antennas. The signal or the power may then be transmitted or received between the communication module 890 and the external electronic device via the selected at least one antenna. According to an embodiment, another component (e.g., a radio frequency integrated circuit (RFIC)) other than the radiating element may be additionally formed as part of the antenna module 897.

According to various embodiments, the antenna module 897 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 801 and the external electronic device 804 via the server 808 coupled with the second network 899. Each of the electronic devices 802 or 804 may be a device of a same type as, or a different type, from the electronic device 801. According to an embodiment, all or some of operations to be executed at the electronic device 801 may be executed at one or more of the external electronic devices 802, 804, or 808. For example, if the electronic device 801 should perform a function or a service automatically, or in response to a request from a user or another device, the electronic device 801, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 801. The electronic device 801 may provide the outcome, with or without further processing of the outcome, as at least part of a reply to the request. To that end, a cloud computing, distributed computing, mobile edge computing (MEC), or client-server computing technology may be used, for example. The electronic device 801 may provide ultra low-latency services using, e.g., distributed computing or mobile edge computing. In another embodiment, the external electronic device 804 may include an internet-of-things (IoT) device. The server 808 may be an intelligent server using machine learning and/or a neural network. According to an embodiment, the external electronic device 804 or the server 808 may be included in the second network 899. The electronic device 801 may be applied to intelligent services (e.g., smart home, smart city, smart car, or healthcare) based on 5G communication technology or IoT-related technology.

Figure 9:
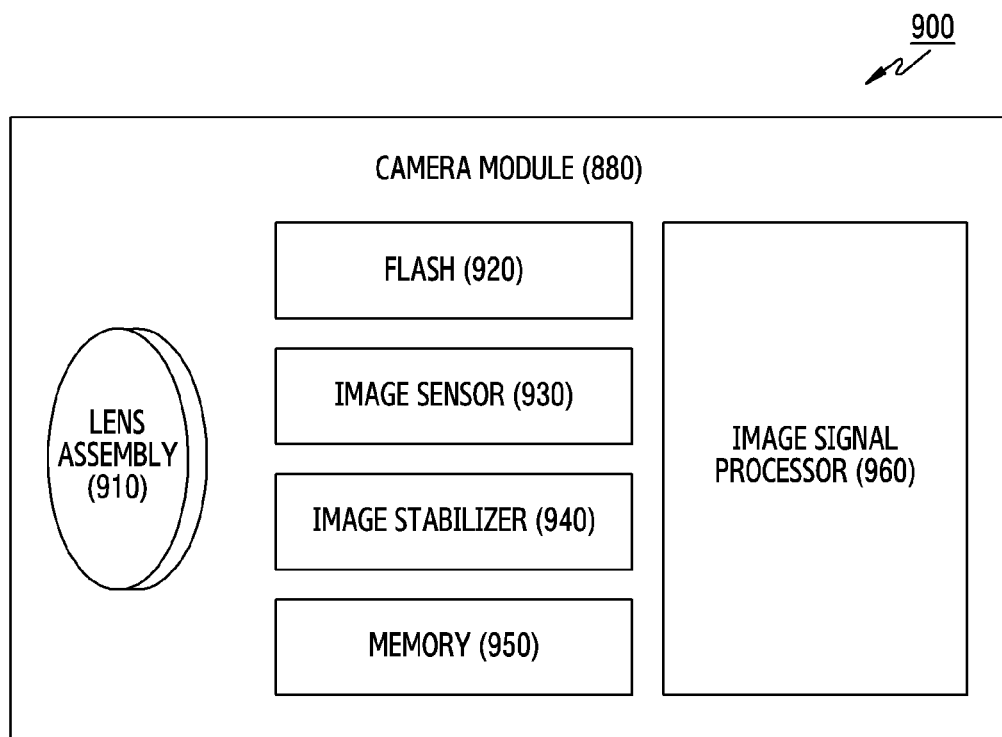
FIG. 9 is a block diagram illustrating a camera module according to various embodiments.

FIG. 9 is a block diagram illustrating a camera module according to various embodiments. Referring to FIG. 9, the camera module 880 may include a lens assembly 910, a flash 920, an image sensor 930, an image stabilizer 940, memory 950 (e.g., buffer memory), or an image signal processor 960. The lens assembly 910 may collect light emitted or reflected from an object whose image is to be taken. The lens assembly 910 may include one or more lenses. According to an embodiment, the camera module 880 may include a plurality of lens assemblies 910. In such a case, the camera module 880 may form, for example, a dual camera, a 360-degree camera, or a spherical camera. Some of the plurality of lens assemblies 910 may have the same lens attribute (e.g., view angle, focal length, auto-focusing, f number, or optical zoom), or at least one lens assembly may have one or more lens attributes different from those of another lens assembly. The lens assembly 910 may include, for example, a wide-angle lens or a telephoto lens.

The flash 920 may emit light that is used to reinforce light reflected from an object. According to an embodiment, the flash 920 may include one or more light emitting diodes (LEDs) (e.g., a red-green-blue (RGB) LED, a white LED, an infrared (IR) LED, or an ultraviolet (UV) LED) or a xenon lamp. The image sensor 930 may obtain an image corresponding to an object by converting light emitted or reflected from the object and transmitted via the lens assembly 910 into an electrical signal. According to an embodiment, the image sensor 930 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 930 may be implemented using, for example, a charged coupled device (CCD) sensor or a complementary metal oxide semiconductor (CMOS) sensor.

The image stabilizer 940 may move the image sensor 930 or at least one lens included in the lens assembly 910 in a particular direction, or control an operational attribute (e.g., adjust the read-out timing) of the image sensor 930 in response to the movement of the camera module 880 or the electronic device 801 including the camera module 880. This allows compensating for at least part of a negative effect (e.g., image blurring) by the movement on an image being captured. According to an embodiment, the image stabilizer 940 may sense such a movement by the camera module 880 or the electronic device 801 using a gyro sensor (not shown) or an acceleration sensor (not shown) disposed inside or outside the camera module 880. According to an embodiment, the image stabilizer 940 may be implemented, for example, as an optical image stabilizer. The memory 950 may store, at least temporarily, at least part of an image obtained via the image sensor 930 for a subsequent image processing task. For example, if image capturing is delayed due to shutter lag or multiple images are quickly captured, a raw image obtained (e.g., a Bayer-patterned image, a high-resolution image) may be stored in the memory 950, and its corresponding copy image (e.g., a low-resolution image) may be previewed via the display device 860. Thereafter, if a specified condition is met (e.g., by a user's input or system command), at least part of the raw image stored in the memory 950 may be obtained and processed, for example, by the image signal processor 960. According to an embodiment, the memory 950 may be configured as at least part of the memory 830 or as a separate memory that is operated independently from the memory 830.

The image signal processor 960 may perform one or more image processing with respect to an image obtained via the image sensor 930 or an image stored in the memory 950. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 960 may perform control (e.g., exposure time control or read-out timing control) with respect to at least one (e.g., the image sensor 930) of the components included in the camera module 880. An image processed by the image signal processor 960 may be stored back in the memory 950 for further processing, or may be provided to an external component (e.g., the memory 830, the display device 860, the electronic device 802, the electronic device 804, or the server 808) outside the camera module 880. According to an embodiment, the image signal processor 960 may be configured as at least part of the processor 820, or as a separate processor that is operated independently from the processor 820. If the image signal processor 960 is configured as a separate processor from the processor 820, at least one image processed by the image signal processor 960 may be displayed, by the processor 820, via the display device 860 as it is or after being further processed.

According to an embodiment, the electronic device 801 may include a plurality of camera modules 880 having different attributes or functions. In such a case, at least one of the plurality of camera modules 880 may form, for example, a wide-angle camera and at least another of the plurality of camera modules 880 may form a telephoto camera. Similarly, at least one of the plurality of camera modules 880 may form, for example, a front camera and at least another of the plurality of camera modules 880 may form a rear camera.

In specific embodiments of the present disclosure described above, components included in the disclosure are expressed as singular or plural according to the specific embodiments presented. However, the singular or plural expression is appropriately selected for the context presented for convenience of description, and the present disclosure is not limited to the singular or plural component, and even if a component is expressed as plural, it may be composed of singular, or even if the component is expressed as singular, it may be composed of plural.

Meanwhile, although specific embodiments have been described in the detailed description of the present disclosure, various modifications are possible without departing from the scope of the present disclosure. Therefore, the scope of the present disclosure should not be limited to the described embodiments and should be defined by the claims described below as well as equivalents to these claims.

In various embodiments, the electronic device 100 may include a plurality of image sensors including the first image sensor 310 and the second image sensor 320, at least one processor 230 electrically connected to the plurality of image sensors, and the display 110 connected to the at least one processor. The processor 230 may activate the first image sensor 310 and the second image sensor 320. The processor 230 may acquire first image data by means of the first image sensor 310, and acquire second image data by means of the second image sensor 320. The processor 230 may determine to output a preview image that is based on the first image data among the first image data and the second image data, to the display 110. In response to the above determination to output the preview image, the processor 230 may set a resolution of the first image data as a first resolution, and set a resolution of the second image data as a second resolution lower than the first resolution.

In an embodiment, the processor 230 may activate the first image sensor 310 and the second image sensor 320, in response to a user input on zoom magnification or acquiring environmental information of a camera.

In an embodiment, the processor 230 may determine to output the preview image that is based on the first image data to the display 110, when an event of acquiring a user input on zoom magnification is ended or an event of acquiring environmental information of a camera is ended.

In an embodiment, the preview image based on the first image data determined to be outputted to the display 110 may be a preview image based on image data acquired through the first image sensor determined based on photographing information of a time point when the event is ended.

In an embodiment, the user input on the zoom magnification may include at least one of a finger-zoom input, a progress-bar zoom input, and a zoom-button input.

In an embodiment, the environmental information of the camera may include at least one of an illuminance value, a distance to an object, and focus information.

In an embodiment, the first image data and the second image data may be image data to which at least one of auto focus, auto exposure, and auto white balance is applied.

In an embodiment, the plurality of image sensors may further include the third image sensor 630, and the processor 230 may activate all of the first image sensor 610, the second image sensor 620, and the third image sensor 630, in response to a user input on zoom magnification or acquiring environmental information of a camera.

In an embodiment, the processor 230 may activate all of the first image sensor 610, the second image sensor 620, and the third image sensor 630, in response to a user input on zoom magnification or acquiring environmental information of a camera. The processor 230 may deactivates the third image sensor 630 in response to the determination to output the preview image that is based on the first image data. In another embodiment, the processor 230 may set a resolution of third image data acquired through the third image sensor 630 as a third resolution lower than the first resolution, in response to the determination to output the preview image that is based on the first image data.

In an embodiment, the third resolution may be the same as the second resolution. The third resolution may be higher than the second resolution. In another embodiment, the third resolution may be lower than the second resolution.

In various embodiments, an operating method of the electronic device 100 may include: activating the first image sensor 310 and the second image sensor 320, acquiring first image data by means of the first image sensor 310, acquiring second image data by means of the second image sensor 320, determining to output a preview image that is based on the first image data among the first image data and the second image data, to a display 110, setting a resolution of the first image data as a first resolution in response to the above determination to output the preview image, and setting a resolution of the second image data as a second resolution lower than the first resolution in response to the above determination to output the preview image.

In an embodiment, the operating method of the electronic device 100 may activate the first image sensor 310 and the second image sensor 320, in response to a user input on zoom magnification or acquiring environmental information of a camera.

In an embodiment, the operating method of the electronic device 100 may include determining to output the preview image that is based on the first image data to the display 110, when an event of acquiring a user input on zoom magnification is ended or an event of acquiring environmental information of a camera is ended.

In an embodiment, the operating method of the electronic device 100 may include additionally activating the third image sensor 630 in addition to the first image sensor 610 and the second image sensor 620, in response to the user input on the zoom magnification or acquiring the environmental information of the camera, and deactivating the third image sensor 630 or setting a resolution of third image data acquired through the third image sensor 630 as a third resolution lower than the first resolution, in response to the determination to output the preview image that is based on the first image data.

In various embodiments, the electronic device 100 may include a plurality of image sensors, at least one processor electrically connected to the plurality of image sensors, and the display 110 connected to the at least one processor. The processor 230 may activate all of the plurality of image sensors, in response to a specified event, and determine the first image sensor 310 among the plurality of image sensors as an image sensor outputting image data to be displayed on the display 110, and, in response to the above determination, set a resolution of first image data acquired through the first image sensor 310 as a first resolution, and set a resolution of second image data acquired through the second image sensor 320 among the plurality of image sensors as a second resolution lower than the first resolution. The determined image sensor may be an image sensor determined based on photographing information of a time point when the specified event is ended.

In an embodiment, the specified event may be an event of a user's input on zoom magnification or acquiring environmental information of a camera. The user's input on the zoon magnification may include at least one of a finger-zoom input, a progress-bar zoom input, and a zoom-button input, and the environmental information may include at least one of an illuminance value, a distance to an object, and focus information.

In an embodiment, the photographing information may include at least one of a zoom magnification value, an illuminance value, a distance to an object, and focus information, which correspond to the time point when the specified event is ended.

In an embodiment, in response to the determination, the processor 230 may deactivate the third image sensor 630 or set a resolution of third image data acquired through the third image sensor 630 as a third resolution lower than the first resolution.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 840) including one or more instructions that are stored in a storage medium (e.g., internal memory 836 or external memory 838) that is readable by a machine (e.g., the electronic device 801). For example, a processor (e.g., the processor 820) of the machine (e.g., the electronic device 801) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:
1. An electronic device comprising:
a plurality of image sensors comprising a first image sensor and a second image sensor;
at least one processor;
a display connected to the at least one processor; and
memory storing instructions being executable by the at least one processor, cause the electronic device to:
execute a camera application;
activate all of the plurality of image sensors, based on at least one specified event executed through the camera application, determine the first image sensor among the plurality of image sensors as an image sensor outputting image data to be displayed on the display;
set a resolution of first image data acquired through the first image sensor as a first resolution; and
in response to the determination of the first image sensor as the image sensor outputting the image data to be displayed on the display, set a resolution of second image data acquired through the second image sensor among the plurality of image sensors as a second resolution lower than the first resolution.

2. The electronic device of claim 1, wherein the at least one specified event comprises a user input on zoom magnification or acquiring environmental information of a camera,
wherein the user input on the zoom magnification comprises at least one of a finger-zoom input, a progress-bar zoom input, and a zoom-button input, and
wherein the environmental information of the camera comprises at least one of an illuminance value, a distance to an object, and focus information.

3. The electronic device of claim 1, wherein the first image sensor is determined based on photographing information of a time point when the at least one specified event is ended.

4. The electronic device of claim 3, wherein the photographing information comprises at least one of a zoom magnification value, an illuminance value, a distance to an object, and focus information, which correspond to the time point when the at least one specified event is ended.

5. The electronic device of claim 1, wherein the plurality of image sensors further comprises a third image sensor, and
the at least one processor deactivate the third image sensor or set a resolution of third image data acquired through the third image sensor as a third resolution lower than the first resolution, in response to the determination of the first image sensor.

6. The electronic device of claim 1, wherein the plurality of image sensors further comprises a third image sensor, and
wherein the memory further storing instructions:
activates all of the first image sensor, the second image sensor, and the third image sensor, in response to a user input on zoom magnification or acquiring environmental information of a camera, and
deactivates the third image sensor in response to the determination to output the preview image that is based on the first image data.

7. The electronic device of claim 1, wherein the plurality of image sensors further comprises a third image sensor, and
wherein the memory further storing instructions:
activates all of the first image sensor, the second image sensor, and the third image sensor, in response to a user input on zoom magnification or acquiring environmental information of a camera, and
sets a resolution of third image data acquired through the third image sensor as a third resolution lower than the first resolution, in response to the determination to output the preview image that is based on the first image data.

8. The electronic device of claim 7, wherein the third resolution is the same as the second resolution.

9. An operating method of an electronic device, comprising:
executing a camera application;
activating all of a plurality of image sensors, based on at least one specified event executed through the camera application, determining a first image sensor among the plurality of image sensors as an image sensor outputting image data to be displayed on a display of the electronic device;
setting a resolution of first image data acquired through the first image sensor as a first resolution; and
in response to the determination of the first image sensor as the image sensor outputting the image data to be displayed on the display, setting a resolution of second image data acquired through a second image sensor among the plurality of image sensors as a second resolution lower than the first resolution.

10. The method of claim 9, wherein the at least one specified event comprises a user input on zoom magnification or acquiring environmental information of a camera,
wherein the user input on the zoom magnification comprises at least one of a finger-zoom input, a progress-bar zoom input, and a zoom-button input, and
wherein the environmental information of the camera comprises at least one of an illuminance value, a distance to an object, and focus information.

11. The method of claim 9, wherein the first image sensor is determined based on photographing information of a time point when the at least one specified event is ended.

12. The method of claim 11, wherein the photographing information comprises at least one of a zoom magnification value, an illuminance value, a distance to an object, and focus information, which correspond to the time point when the at least one specified event is ended.

13. The method of claim 9, further comprising:
deactivating a third image sensor among the plurality of image sensors or set a resolution of third image data acquired through the third image sensor as a third resolution lower than the first resolution, in response to the determination of the first image sensor.

14. The method of claim 9, further comprising:
activating all of the first image sensor, the second image sensor, and the third image sensor, in response to a user input on zoom magnification or acquiring environmental information of a camera, and
deactivating the third image sensor in response to the determination to output the preview image that is based on the first image data.

15. The method of claim 9, further comprising:
activating all of the first image sensor, the second image sensor, and the third image sensor, in response to a user input on zoom magnification or acquiring environmental information of a camera, and
setting a resolution of third image data acquired through the third image sensor as a third resolution lower than the first resolution, in response to the determination to output the preview image that is based on the first image data.

16. The method of claim 15, wherein the third resolution is the same as the second resolution.

17. A non-transitory computer readable medium comprising instructions, which, when executed by an electronic device, cause the electronic device to perform operations comprising:
executing a camera application;
activating all of a plurality of image sensors,
based on at least one specified event executed through the camera application, determining a first image sensor among the plurality of image sensors as an image sensor outputting image data to be displayed on a display of the electronic device;
setting a resolution of first image data acquired through the first image sensor as a first resolution; and in response to the determination of the first image sensor as the image sensor outputting the image data to be displayed on the display, setting a resolution of second image data acquired through a second image sensor among the plurality of image sensors as a second resolution lower than the first resolution.

* * * * *